2405X
D. Beard.
Blocking & Stretching Hats.
No. Patented May 28, 1816.
Fig. 2.
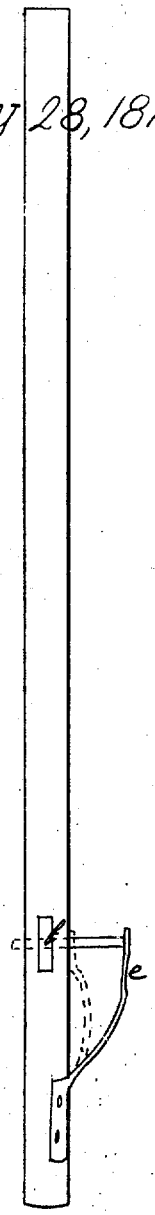
Fig. 1.
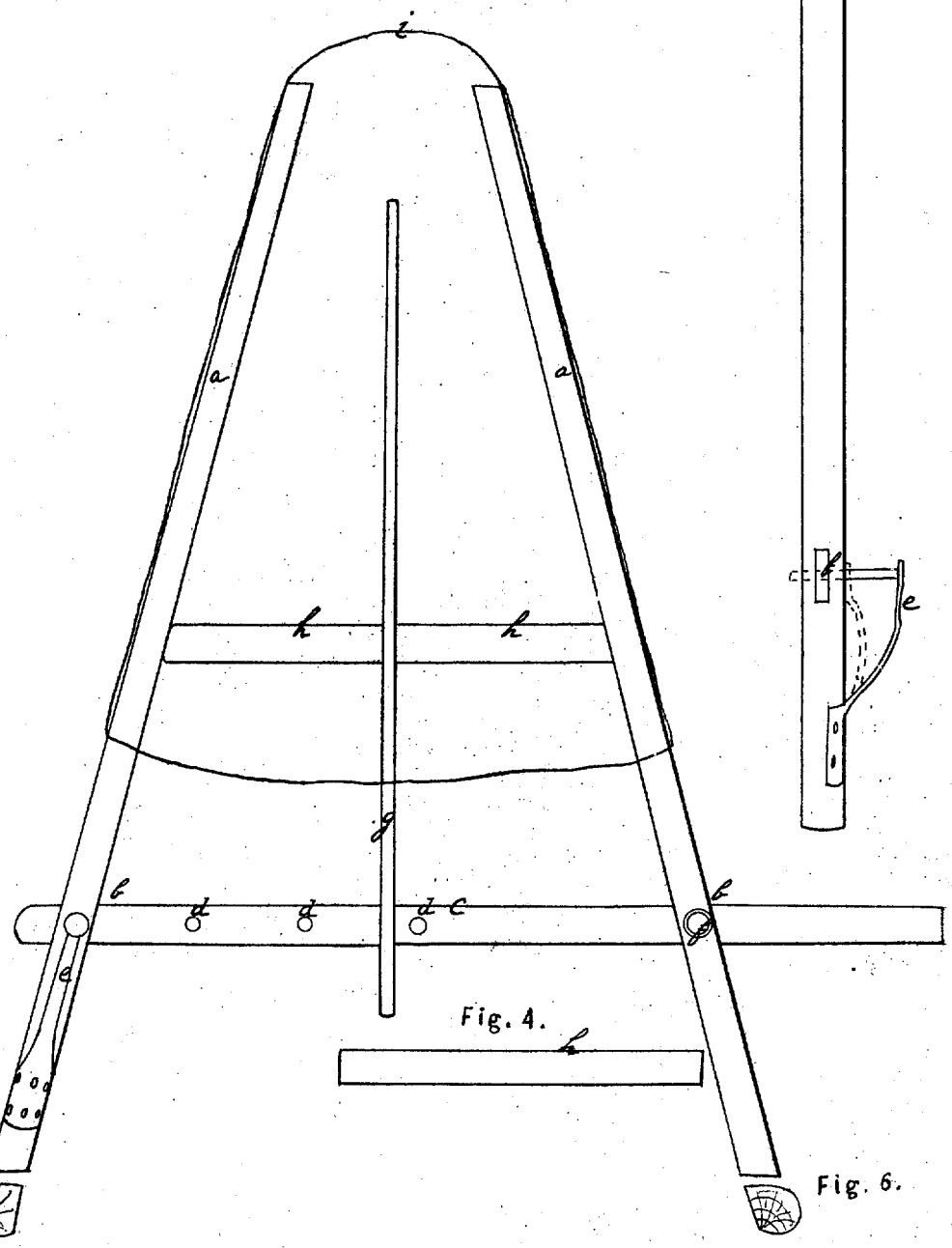
Fig. 3.
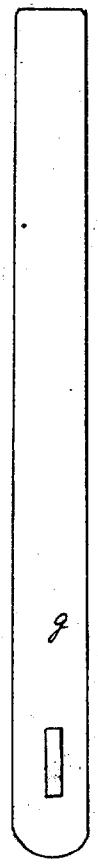
Fig. 4.
Fig. 5.
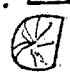
Fig. 6.

May 28, 1816 2605X

David Beard

Letters Patent

The schedule referred to in these Letters Patent and mak-
ing part of the same containing a description in the words of the
said David Beard himself, of his improvement in block-
ing Hats. The above machine consists of five
pieces of wood and three pieces of Iron two of s^d pieces
of wood are twenty two inches long and two and a half inches
wide, flat on one side. and rounding on the other. with a Mor-
tise through each of them. About five inches from one end
in these Mortises works an iron bar nineteen inches long
and seven eights of an inch wide with four holes through
it about one inch apart from the middle to one end
which end goes through one of the aforesaid Mortises and is
held to its place by a Spring-bolt fastened on the side
of the piece of wood. for the purpose of making the Machine
wider or narrower: the other end of the bar is rivetted into
the other mortise. Between the wooden bars works an
iron tongue. and plays loose on the Iron bar. on the [illegible]
of which tongue works three pieces of wood of different lengths
used separately as occasion requires. as the aforesaid bars
are made wider or narrower. By means of which ma-
chine. The tip of the hat is stretched out. The hat be-
ing put on the blocks the machine set perpendicularly
into it. by forcing the upper ends of the aforesaid wooden
bars together. which of course widens the lower ends and
prepares the hat for the block.

Witnesses
William Beard
John Hale

David Beard

Exd
1141

Drawing [illegible]